United States Patent
Xu et al.

(10) Patent No.: US 9,608,509 B2
(45) Date of Patent: Mar. 28, 2017

(54) SWITCHING CONVERTER WITH CONTROLLABLE RESTART DELAY AND ASSOCIATED CONTROL METHOD

(71) Applicant: Chengdu Monolithic Power Systems Co., Ltd., Chengdu (CN)

(72) Inventors: Li Xu, Chengdu (CN); Yike Li, Chengdu (CN)

(73) Assignee: CHENGDU MONOLITHIC POWER SYSTEMS CO., LTD., Chengdu (CN)

( * ) Notice: Subject to any disclaimer, the term of this patent is extended or adjusted under 35 U.S.C. 154(b) by 279 days.

(21) Appl. No.: 14/470,229

(22) Filed: Aug. 27, 2014

(65) Prior Publication Data

US 2015/0061630 A1 Mar. 5, 2015

(30) Foreign Application Priority Data

Aug. 27, 2013 (CN) .......................... 2013 1 0379257

(51) Int. Cl.
*H02M 1/32* (2007.01)
*H02M 1/36* (2007.01)
*H02M 3/156* (2006.01)

(52) U.S. Cl.
CPC ............... *H02M 1/32* (2013.01); *H02M 1/36* (2013.01); *H02M 3/156* (2013.01); *H02M 2001/322* (2013.01)

(58) Field of Classification Search
CPC .... H02M 1/32; H02M 1/36; H02M 2001/322; H02M 3/156
See application file for complete search history.

(56) References Cited

U.S. PATENT DOCUMENTS

| 7,313,004 B1 * | 12/2007 | Yang | .................. H02M 3/33523 363/21.02 |
| 2009/0303641 A1 * | 12/2009 | Abe | ......................... H02M 1/32 361/18 |
| 2013/0335052 A1 | 12/2013 | Li | |
| 2014/0049235 A1 | 2/2014 | Li | |

* cited by examiner

Primary Examiner — Fred E Finch, III
Assistant Examiner — Rafael O De Leon Domenech

(57) ABSTRACT

A switching converter providing an output voltage has a first switch and a control circuit. The control circuit provides an auxiliary power supply voltage, and a switching control signal to control the first switch based on the output voltage and a reference signal. The switching converter is shut down by the control circuit when a fault happens, and the switching converter restarts when the auxiliary power supply voltage decreases to a first threshold.

18 Claims, 5 Drawing Sheets

SWITCHING CONVERTER WITH CONTROLLABLE RESTART DELAY AND ASSOCIATED CONTROL METHOD

CROSS-REFERENCE TO RELATED APPLICATION(S)

This application claims the benefit of CN application No. 201310379257.8, filed on Aug. 27, 2013, and incorporated herein by reference.

TECHNICAL FIELD

The present invention relates to electrical circuit, more particularly but not exclusively relates to switching converter.

BACKGROUND

Recently, switching converter is widely used for supplying power to electronic devices because of its fast transient response and high power efficiency. Traditionally, when a fault happens, a power management ICs (integrated circuits) comprising a switching converter is shut shown and will try to auto restart after a safe delay time period, e.g., 2 ms. However, large and complex timing circuits are needed to generate the delay time period, and as a result, cost and circuit area are both increased.

SUMMARY

It is one of the objects of the present invention to provide switching converter, control circuit and associated control method.

One embodiment of the present invention discloses a control circuit for controlling a switching converter, the switching converter having a first switch and an output terminal configured to provide an output voltage, the control circuit comprising: a voltage regulating circuit, configured to provide an auxiliary power supply voltage across a capacitor; a switching control circuit, configured to provide a pulse signal based on a reference signal and a feedback signal representative of the output voltage; a first logic circuit, coupled to the switching control circuit, and wherein the first logic circuit is configured to provide a switching control signal to a control terminal of the first switch based on a protection signal and the pulse signal; and a restart delay circuit, coupled to the voltage regulating circuit, wherein the restart delay circuit is configured to provide an enable signal based on the protection signal and the auxiliary power supply voltage, and wherein when the protection signal is in a first state, the enable signal is configured to disable the voltage regulating circuit and the switching control circuit until the auxiliary power supply voltage decreases to a first threshold.

Another embodiment of the present invention discloses a switching converter having an input terminal and an output terminal configured to provide an output voltage, wherein the switching converter comprising: a first switch, having a control terminal, wherein the first switch is coupled between the input terminal and the output terminal of the switching converter; a capacitor, having a first terminal and a second terminal; and a control circuit, having an input terminal, a first output terminal and a second output terminal, wherein the input terminal is coupled to the output terminal of the switching converter, the first output terminal is configured to provide a switching control signal to the control terminal of the first switch, and the second output terminal is coupled to the first terminal of the capacitor to provide an auxiliary power supply voltage; and wherein the switching converter is shut down by the control circuit when a fault happens on the switching converter, and the switching converter restarts after a delay time period, wherein the delay time period is related to the auxiliary power supply voltage.

Yet another embodiment of the present invention discloses a control method for a switching converter, the switching converter having a first switch and an output terminal configured to provide an output voltage, the control method comprising: providing an auxiliary power supply voltage across a capacitor; and providing a switching control signal to a control terminal of the first switch based on a reference signal and the output voltage; and wherein the switching converter is shut down when a fault happens on the switching converter, and the switching converter restarts after a delay time period, wherein the delay time period is related to a time period that the auxiliary power supply voltage decreases from a predetermined voltage level to a first threshold.

In embodiments of the present invention, when a fault happens on a switching converter, the switching converter is shut down, and a restart delay time period of the switching converter is related to a time period that an auxiliary power supply voltage decreases from a predetermined voltage level to a first threshold, which avoids a complex timing circuit. Cost and circuit area are both reduced, and system design becomes easier. And the system is easier to be integrated, too.

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

In the present application, numerous specific details are provided, such as examples of circuits, components, and methods, to provide a thorough understanding of embodiments of the invention. These embodiments are exemplary, not to confine the scope of the invention. Persons of ordinary skill in the art will recognize, however, that the invention can be practiced without one or more of the specific details. In other instances, well-known details are not shown or described to avoid obscuring aspects of the invention. Some phrases are used in some exemplary embodiments. However, the usage of these phrases is not confined to these embodiments.

Several embodiments of the present invention are described below with reference to switching converter, control circuit and associated control method. As used hereinafter, the term "couple" generally refers to multiple ways including a direct connection with an electrical conductor and an indirect connection through intermediate diodes, resistors, capacitors, and/or other intermediaries.

Figure 1:
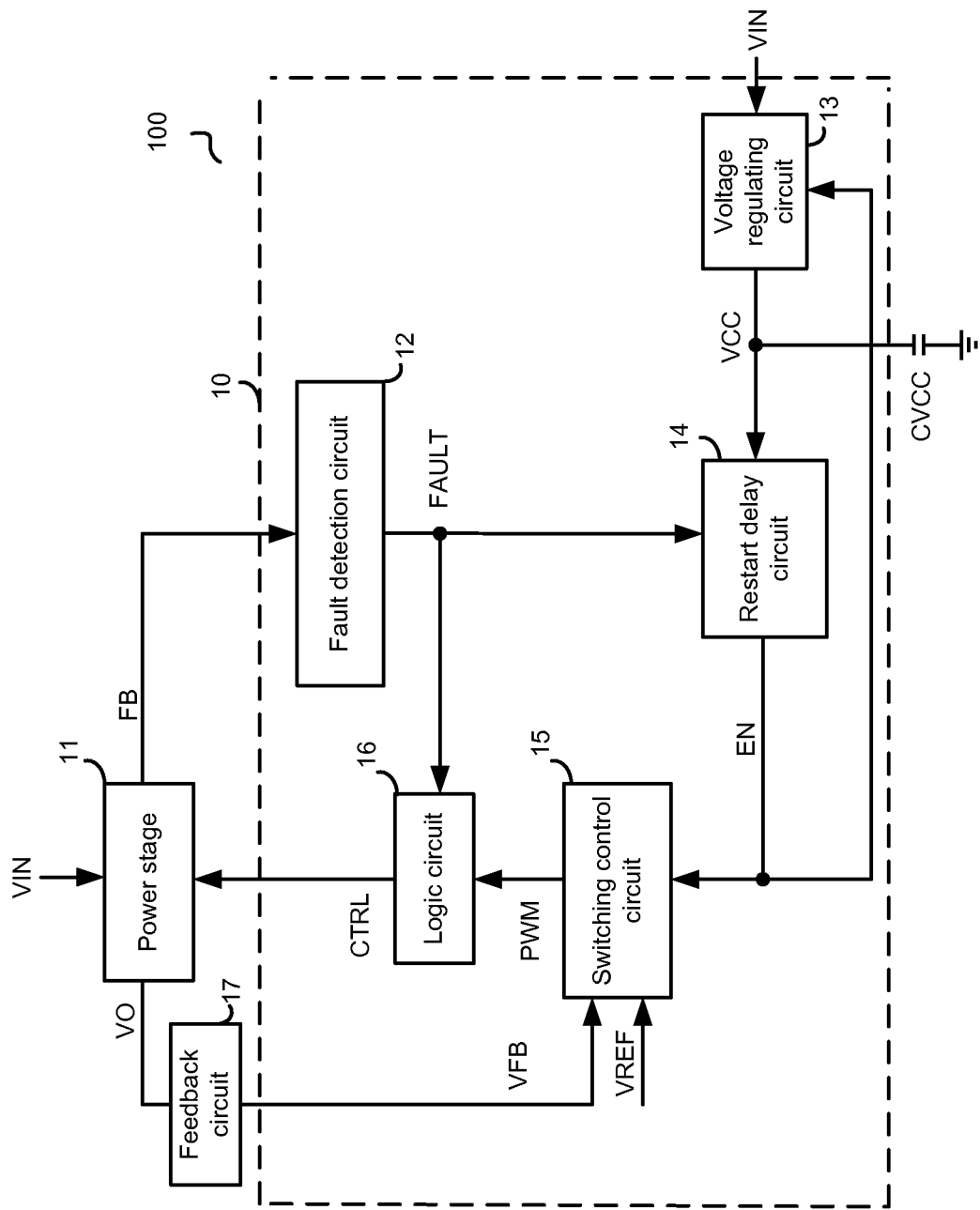
FIG. 1 illustrates a circuit block diagram of a switching converter 100 according to an embodiment of the present invention.

FIG. 1 illustrates a circuit block diagram of a switching converter 100 according to an embodiment of the present invention. Switching converter 100 comprises a power stage 11, a control circuit 10 and a capacitor CVCC.

In some embodiments, power stage 11 comprises at least one switch, and power stage 11 is configured to convert an input voltage VIN to an output voltage VO via turning ON and turning OFF the at least one switch. Control circuit 10 is configured to provide a switching control signal CTRL to control power stage 11. One terminal of capacitor CVCC is coupled to a system ground, and the other terminal of capacitor CVCC is coupled to control circuit 10. Control circuit 10 is configured to provide an auxiliary power supply voltage VCC across capacitor CVCC. When in a fault condition, switching converter 100 is shut down by control circuit 10. And after a restart delay time period, switching converter 100 tries to restart. The restart delay time period relates to a time period that auxiliary power supply voltage VCC decreases to a first threshold.

In some embodiments, control circuit 10 may comprise a fault detection circuit 12, a voltage regulating circuit 13, a restart delay circuit 14, a switching control circuit 15 and a logic circuit 16. In one embodiment, power stage 11 provides a signal FB for monitoring if there is any fault happening on switching converter 100. Signal FB may be a circuit parameter representing for example, but not limited to, output voltage VO, input voltage VIN, an output current IO, a temperature of power stage 11 or a temperature of control circuit 10.

Fault detection circuit 12 is configured to receive signal FB and provide a protection signal FAULT. When fault detection circuit 12 detects a fault on switching converter 100, i.e., switching converter 100 is in the fault condition, protection signal FAULT becomes effective, e.g., logic HIGH, to protect switching converter 100. Power stage 11 is shut down by logic circuit 16 when protection signal FAULT is effective. Voltage regulating circuit 13 is configured to receive input voltage VIN and an enable signal EN, and is configured to provide auxiliary power supply voltage VCC across capacitor CVCC. One of ordinary skill in the art should appreciate that voltage regulating circuit 13 may comprise any suitable circuit having an ability to provide a predetermined voltage level, such as comprising a current source, a linear regulator, a switching regulator and so on. Restart delay circuit 14 is configured to receive protection signal FAULT and auxiliary power supply voltage VCC and is configured to provide enable signal EN based on protection signal FAULT and auxiliary power supply voltage VCC. When a fault happens on switching converter 100, enable signal EN is configured to disable voltage regulating circuit 13, and capacitor CVCC is discharged and auxiliary power supply voltage VCC decreases. When auxiliary power supply voltage VCC decreases less than a threshold VTH1, enable signal EN is configured to enable voltage regulating circuit 13. Switching control circuit 15 is configured to receive a reference signal VREF, enable signal EN, and a feedback signal VFB representing output voltage VO, and switching control circuit 15 is configured to provide a pulse signal PWM based on reference signal VREF and feedback signal VFB. When a fault happens on switching converter 100, enable signal EN is configured to disable switching control circuit 15, pulse signal PWM becomes ineffective, and the at least one switch in power stage 11 is turned OFF. When auxiliary power supply voltage VCC decreases less than a threshold VTH1, enable signal EN is configured to enable switching control circuit 15 to provide effective pulse signal PWM. Logic circuit 16 is configured to receive protection signal FAULT and pulse signal PWM, and is configured to provide switching control signal CTRL to turn ON and turn OFF the at least one switch in power stage 11 based on protection signal FAULT and pulse signal PWM. In one embodiment, power stage 11 further comprises a feedback circuit 17 to provide feedback signal VFB representing output voltage VO.

When a fault happens on switching converter 100, switching control circuit 15 and voltage regulating circuit 13 are disabled by enable signal EN, the at least one switch in power stage 11 is turned OFF, and capacitor CVCC is discharged. When auxiliary power supply voltage VCC across capacitor CVCC decreases less than threshold VTH1, switching control circuit 15 and voltage regulating circuit 13 are enabled by enable signal EN, switching converter 100 restarts. In one embodiment, when a fault happens on switching converter 100, almost every circuit in control circuit 10 is disabled, i.e., shut down, except restart delay circuit 14, e.g., fault detection circuit 12, voltage regulating circuit 13, switching control circuit 15 and logic circuit 16 are all disabled. As a result, when disabled by enable signal EN, control circuit 10 consumes very little power, capacitor CVCC draws a tiny current, such as 1~10 uA, and it will take a long time period to discharge capacitor CVCC by such tiny current.

When protection signal FAULT is effective, switching converter 100 is shut down and tries to restart until a delay time period expired. The delay time period is related to a discharging time period of capacitor CVCC, as a result, complex counting or timing circuits are avoided, cost and circuit area are both reduced and control circuit 10 is easier to be integrated on a chip.

Figure 2:
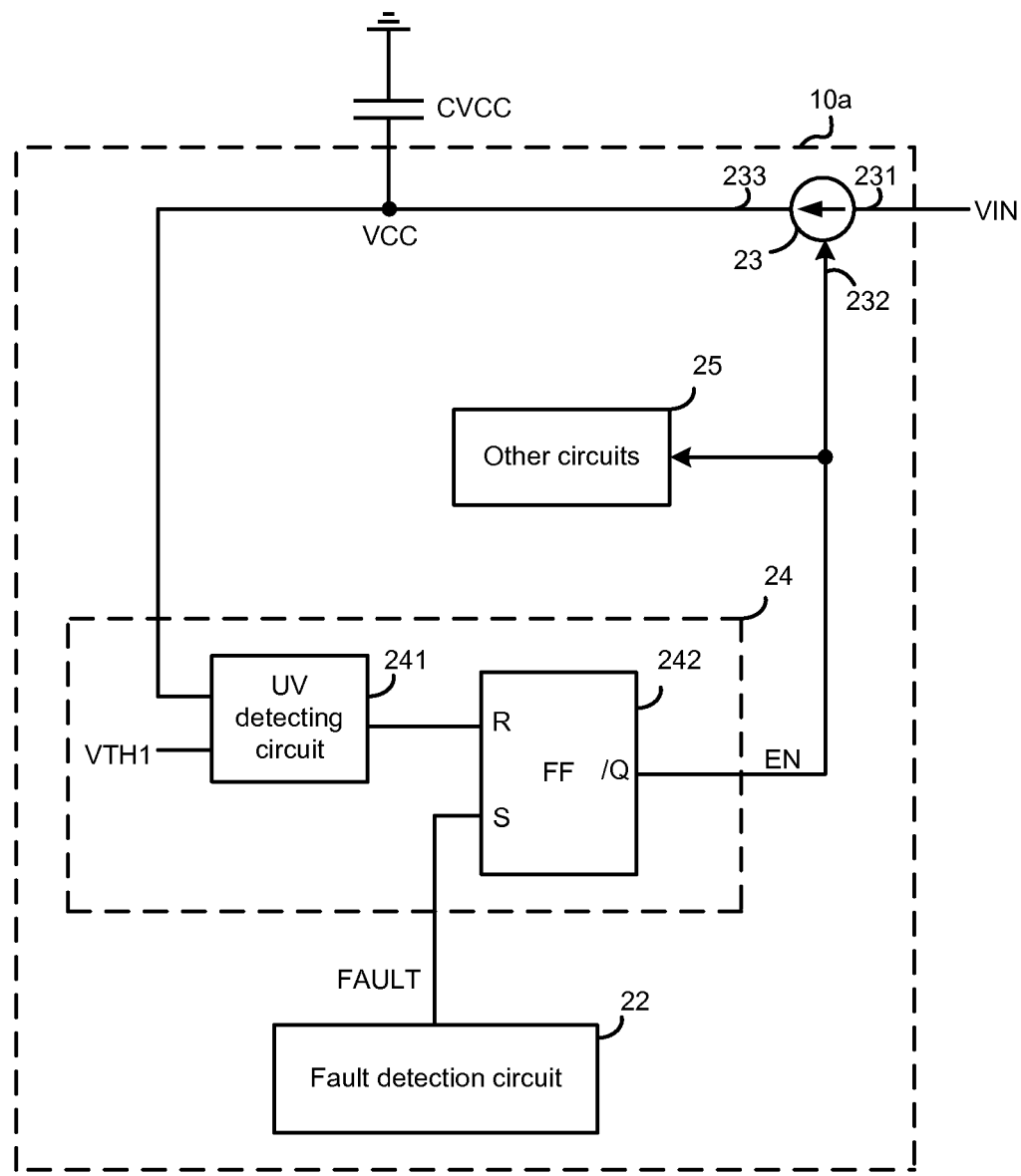
FIG. 2 schematically illustrates a control circuit 10a according to an embodiment of the present invention.

FIG. 2 schematically illustrates a control circuit 10a according to an embodiment of the present invention. Control circuit 10a comprises a fault detection circuit 22, a voltage regulating circuit 23, a restart delay circuit 24 and other circuits 25.

Fault detection circuit 22 is configured to provide protection signal FAULT based on switching converter 100. When switching converter 100 is in the fault condition, protection signal FAULT becomes effective, e.g., logic HIGH. In one embodiment, the fault condition of switching converter 100 comprises, but not limited to, over temperature, short circuit, open loop, and over current. Voltage regulating circuit 23 comprises a current source, having an input terminal 231, an output terminal 233 and a control terminal 232, wherein input terminal 231 is configured to receive input voltage VIN, control terminal 232 is configured to receive enable signal EN, and output terminal 233 is coupled to one terminal of capacitor CVCC to provide auxiliary power supply voltage VCC. In one embodiment, when fault signal FAULT is logic HIGH, voltage regulating circuit 23 is disabled by enable signal EN, and capacitor CVCC is discharged, either by itself or by a current source. In one embodiment, restart delay circuit 24 comprises an under-voltage (UV) detecting circuit 241 and a flip-flop 242. UV detecting circuit 241 comprises a first input terminal configured to receive auxiliary power supply voltage VCC, a second input terminal configured to receive threshold VTH1, and an output terminal. In one embodiment, UV detecting circuit 241 comprises a comparator. Flip-flop 242 comprises a set terminal S, a reset terminal R and an output terminal /Q, wherein set terminal S is coupled to fault detection circuit 22 to receive protection signal FAULT, reset terminal R is coupled to the output terminal of UV detecting circuit 241, and output terminal /Q is configured to provide enable signal EN. In one embodiment, when protection signal FAULT is logic HIGH, flip-flop 242 provides enable signal EN to disable voltage regulating circuit 23 and other circuits 25. When auxiliary power supply voltage VCC is less than threshold VTH1, flip-flop 242 is reset by UV detecting circuit 241 and provides enable signal EN to enable voltage regulating circuit 23 and other circuits 25. Other circuits 25 comprise a control terminal configured to receive enable signal EN. In one embodiment, other circuits 25 may comprise one or some of a switching control circuit, a band-gap circuit, a logic circuit, a driving circuit and so on In one embodiment, when switching converter 100 is detected in the fault condition, protection signal FAULT becomes logic HIGH, voltage regulating circuit 23 and other circuits 25 are disabled, i.e., shut down, and capacitor CVCC is discharged. When auxiliary power supply voltage VCC decreases less than threshold VTH1, voltage regulating circuit 23 and other circuits 25 are enabled by enable signal EN, voltage regulating circuit 23 is configured to provide auxiliary power supply voltage VCC with the predetermined voltage level, and switching converter 100 restarts. In one embodiment, control circuit 10a is integrated on a control integrated circuit (IC). The at least one switch of power stage 11 may also be integrated on the control IC. In one embodiment, when switching converter 100 is in the fault condition, fault detection circuit 22, voltage regulating circuit 23 and other circuits 25 are disabled, i.e., shut down. As a result, power loss caused by the control IC is greatly reduced. In one embodiment, when any fault happens on switching converter 100, the control IC is disabled until a delay time period expired, wherein the delay time period equals to a time period that auxiliary power supply voltage VCC decreases from the predetermined voltage level to threshold VTH1. In one embodiment, the delay time period is related to a discharge time period of capacitor CVCC. It is noted that the logics of "HIGH" or "LOW" for the logic signals may be in alternative levels since different logic levels may lead to a same result.

Figure 3:
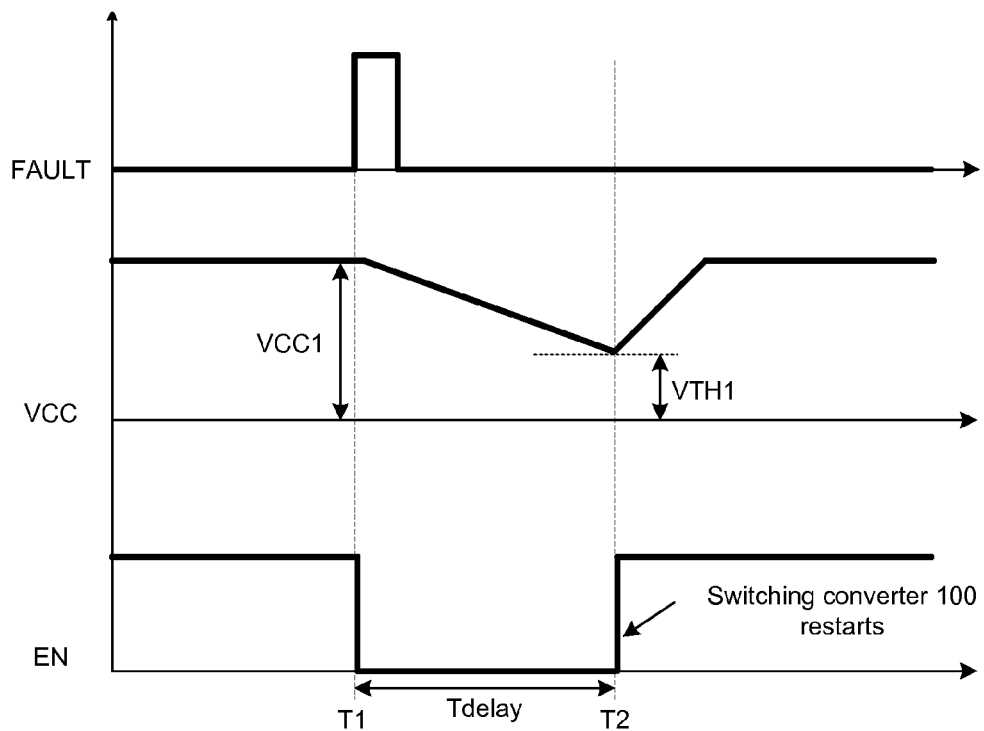
FIG. 3 shows waveforms illustrating signals of control circuit 10a as shown in FIG. 2 according to an embodiment of the present invention.

FIG. 3 shows waveforms illustrating signals of control circuit 10a as shown in FIG. 2 according to an embodiment of the present invention. FIG. 3 shows protection signal FAULT, auxiliary power supply voltage VCC and enable signal EN. As shown in FIG. 3, when switching converter 100 works normally, protection signal FAULT is logic LOW, auxiliary power supply voltage VCC equals to a predetermined voltage level VCC1, and enable signal EN is logic HIGH to enable voltage regulating circuit 23 and other circuits 25. At time T1, a fault happens on switching converter 100 and protection signal FAULT becomes logic HIGH, flip-flop 242 is set and enable signal EN becomes logic LOW, voltage regulating circuit 23 and other circuits 25 are disabled, as a result, auxiliary power supply voltage VCC draws very little current, almost zero ampere. Capacitor CVCC is discharged naturally and auxiliary power supply voltage VCC decreases slowly. At time T2, auxiliary power supply voltage VCC decreases less than threshold VTH1, flip-flop 242 is reset and enable signal EN becomes logic HIGH again to enable voltage regulating circuit 23 and other circuits 25, switching converter 100 restarts and auxiliary power supply voltage VCC increases to predetermine voltage level VCC1.

As shown in FIG. 3, restart delay time period Tdelay refers to a time period from time T1 that protection signal FAULT becomes logic HIGH to time T2 that switching converter 100 tries to restart. In one embodiment, restart delay time period Tdelay is:

$$T\text{delay}=CVCC(VCC1-VTH1)/I\text{discharge};$$

Where Idischarge is a discharge current of capacitor CVCC. In one embodiment, restart time period Tdelay is varied with capacitance of capacitor CVCC and discharge current Idischarge.

Figure 4:
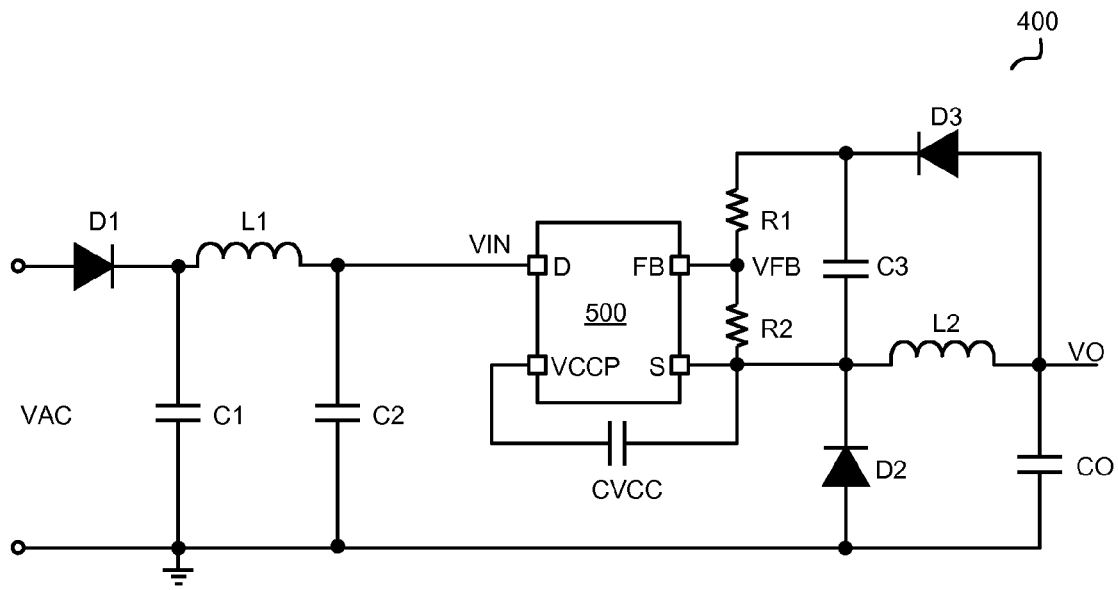
FIG. 4 schematically illustrates a step-down converter 400 according to an embodiment of the present invention.

FIG. 4 schematically illustrates a step-down converter 400 according to an embodiment of the present invention. One of ordinary skill in the art should appreciate that switching converter 400 may also comprise any other suitable topology without detracting from merits of the present invention, e.g., Boost converter, Buck-Boost converter, Flyback converter, and forward converter and so on.

Figure 5:
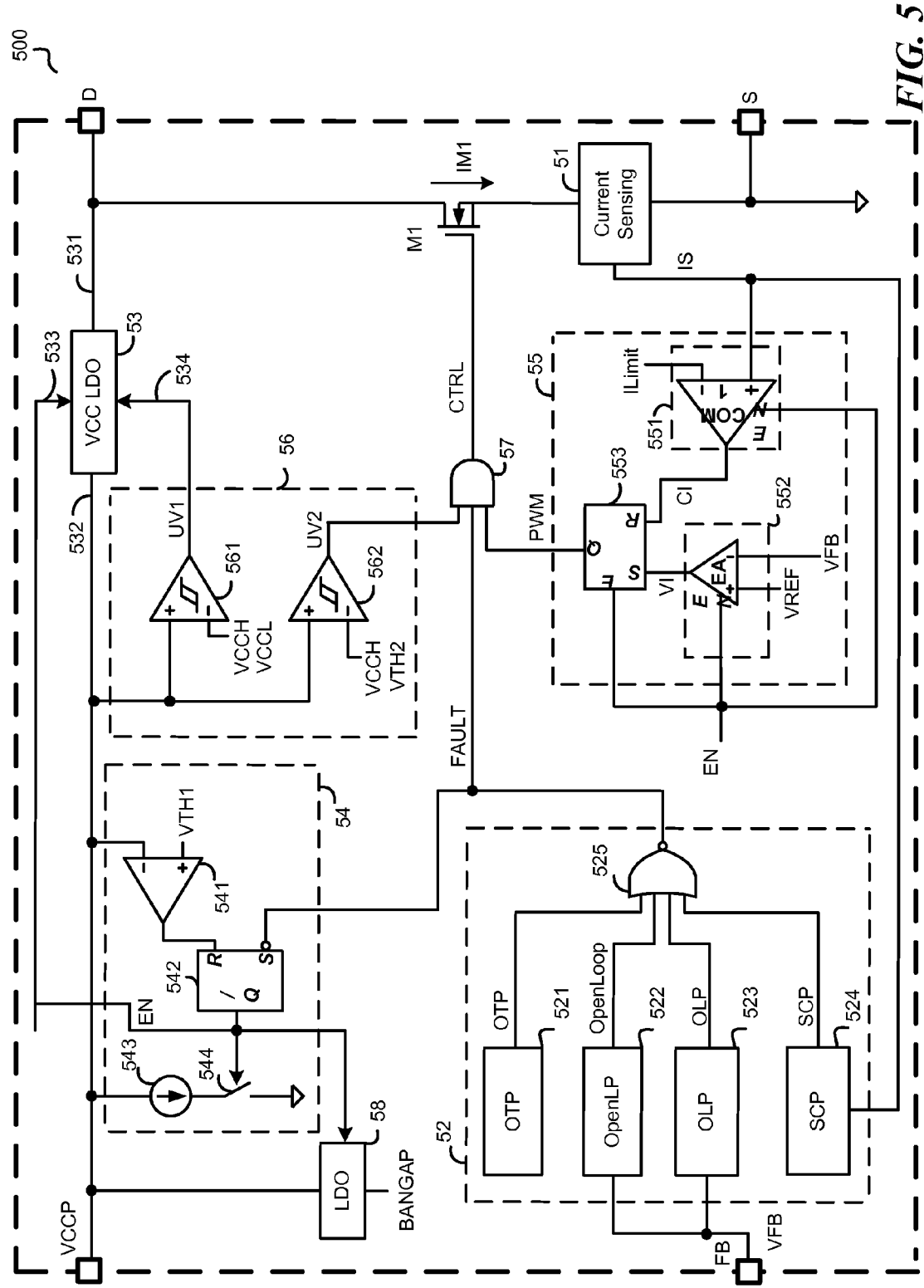
FIG. 5 schematically illustrates a control IC 500 of switching converter 400 as shown in FIG. 4 according to an embodiment of the present invention.

Step-down converter 400 comprises a diode D1, an input filter comprising an inductor L1, a capacitor C1 and a capacitor C2, a control IC 500, a diode D2, and an output filter comprising an inductor L2 and a capacitor CO. Step-down converter 400 is configured to receive an AC (alternating current) input voltage VAC and is configured to provide an DC (direct current) input voltage VIN through diode D1 and the input filter. Diode D1 comprises an anode coupled to receive AC input voltage VAC and a cathode. One terminal of inductor L1 and one terminal of capacitor C1 are coupled to the cathode of diode D1, and the other terminal of capacitor C1 is coupled to the system ground. One terminal of capacitor C2 is coupled to the other terminal of inductor L1, and the other terminal of capacitor C2 is coupled to the system ground. Control IC 500 is configured to receive DC input voltage VIN, and is configured to provide DC output voltage VO through the output filter. Control IC 500 comprises a Pin D, a Pin VCCP, a Pin S and a Pin FB, wherein Pin D is coupled to receive DC input voltage VIN, Pin VCCP is coupled to Pin S through capacitor CVCC, Pin S is configured to provide output voltage VO through the output filter, and Pin FB is configured to receive feedback signal VFB. A detailed circuit schematic of control IC 500 is shown in FIG. 5. Diode D2 comprises an anode coupled to the system ground and a cathode coupled to Pin S. One terminal of inductor L2 is coupled to the cathode of diode D2, the other terminal of inductor L2 is coupled to one terminal of capacitor CO, and the other terminal of capacitor CO is coupled to the system ground. Step-down converter 400 further comprises a feedback circuit comprising a resistor R1, a resistor R2, a diode D3 and a capacitor C3. Diode D3 comprises an anode coupled to a common terminal of inductor L2 and capacitor CO, and a cathode coupled to one terminal of capacitor C3, and the other terminal of capacitor C3 is coupled to Pin S. One terminal of resistor R1 is coupled to the cathode of diode D3, and the other terminal of resistor R1 is coupled to Pin FB. One terminal of resistor R2 is coupled to Pin FB, and the other terminal of resistor R2 is coupled to Pin S.

FIG. 5 schematically illustrates control IC 500 of switching converter 400 as shown in FIG. 4 according to an embodiment of the present invention. As shown in FIG. 5, control IC 500 comprises a switch M1, a current sensing circuit 51, a fault detection circuit 52, a VCC LDO (Low Dropout Regulator) as voltage regulating circuit 53, a restart delay circuit 54, a switching control circuit 55, an under-voltage-lock-out circuit 56, a logic circuit 57 and a band-gap reference circuit 58.

Switch M1 comprises a first terminal coupled to Pin D, a second terminal coupled to Pin S, and a control terminal. Switch M1 may be any controllable semiconductor device, for example, Metal-Oxide-Semiconductor Filed Effect Transistor (MOSFET), Junction Field-Effect Transistor (JFET), and Insulated Gate Bipolar Transistor (IGBT) and so on. In one embodiment, current sensing circuit 51 comprises an input terminal coupled to the second terminal of switch M1, and an output terminal configured to provide a current sense signal IS based on a current IM1 flowing through switch M1. In one embodiment, Pin S is coupled to a chip ground.

Fault detection circuit 52 comprises an over-temperature protection (OTP) circuit 521, an open loop protection (OpenLP) circuit 522, an over-load protection (OLP) circuit 523, a short circuit protection (SCP) circuit 524 and a logic circuit 525. When temperature on control IC 500 is larger than a temperature threshold, e.g., 150° C., OTP circuit 521 is configured to provide a logic HIGH protection signal OTP (e.g., OTP="1"). Open loop protection circuit 522 comprises an input terminal coupled to Pin FB and an output terminal configured to provide a protection signal OpenLoop based on feedback signal VFB. In one embodiment, when feedback signal VFB is less than an open loop protection threshold, e.g., 150 mV, open loop protection circuit 522 is configured to provide logic HIGH protection signal OpenLoop (e.g., OpenLoop="1"). OLP circuit 523 comprises an input terminal coupled to Pin FB and an output terminal configured to provide a protection signal OLP based on feedback signal VFB. In one embodiment, when feedback signal VFB keeps less than an OLP threshold during a certain time period, OLP circuit 523 is configured to provide logic HIGH protection signal OLP (e.g., OLP="1"). SCP circuit 524 comprises an input terminal coupled to the output terminal of current sensing circuit 51, and an output terminal configured to provide a protection signal SCP based on current sense signal IS. In one embodiment, when current sense signal IS is larger than a SCP protection threshold, e.g., 0.6V, SCP circuit 524 is configured to provide logic HIGH protection signal SCP (e.g., SCP="1"). Logic circuit 525 is configured to provide protection signal FAULT based on protection signal OTP, protection signal OpenLoop, protection signal OLP and protection signal SCP. As shown in FIG. 5, protection signal FAULT becomes effective (logic LOW), when any of protection signal OTP, protection signal OpenLoop, protection signal OLP or protection signal SCP is logic HIGH. In one embodiment, fault detection circuit 52 may further comprise a protection delay circuit, configured to provide a protection delay time period. When switching converter 400 is detected in the fault condition, protection signal FAULT becomes logic LOW after the protection delay time period expired. In one embodiment, logic circuit 525 comprises a NOR gate.

Voltage regulating circuit 53 comprises an input terminal 531, a control terminal 533, a control terminal 534 and an output terminal 532, wherein input terminal 531 is coupled to Pin D to receive DC input voltage VIN, control terminal 533 is configured to receive enable signal EN, control terminal 534 is configured to receive an under voltage indicating signal UV1, and output terminal 532 is configured to provide auxiliary power supply voltage VCC at Pin VCCP. In one embodiment, when enable signal EN is logic LOW, or under voltage indicating signal UV1 is logic HIGH, voltage regulating circuit 53 is shut down, and capacitor CVCC is discharged to reduce auxiliary power supply voltage VCC. In one embodiment, when enable signal EN is logic HIGH and under voltage indicating signal UV1 is logic LOW, voltage regulating circuit 53 works normally to charge capacitor CVCC, then auxiliary power supply voltage VCC increases or maintains at a predetermined voltage level.

Restart delay circuit 54 comprises an under-voltage detecting circuit 541 and a flip-flop 542. Under-voltage detecting circuit 541 comprises a comparator, having a non-inverting terminal, an inverting terminal and an output terminal, wherein the non-inverting terminal is configured to receive threshold VTH1, and the inverting terminal is coupled to Pin VCCP to receive auxiliary power supply voltage VCC. Flip-flop 542 comprises a set terminal S, a reset terminal R and an output terminal /Q, wherein set terminal S is coupled to the output terminal of fault detection circuit 52, reset terminal R is coupled to the output terminal of under-voltage detecting circuit 541, and the output terminal /Q is configured to provide enable signal EN. When protection signal FAULT is logic LOW, flip-flop 542 is set to provide logic LOW enable signal EN, and until auxiliary power supply voltage VCC decreases less than threshold VTH1, flip-flop 542 is reset to provide logic HIGH enable signal EN. In one embodiment, restart delay circuit 54 further comprises a discharging circuit comprising a current source 543 and a switch 544. One terminal of current source 543 is coupled to receive auxiliary power supply voltage VCC, the other terminal of current source 543 is coupled to one terminal of switch 544, the other terminal of switch 544 is coupled to the chip ground, and a control terminal of switch 544 is coupled to the output terminal of flip-flop 542 to receive enable signal EN. When enable signal EN is logic LOW, switch 544 is turned ON, capacitor CVCC is discharged by current source 543. When enable signal EN is logic HIGH, switch 544 is turned OFF. In one embodiment, restart delay time period Tdelay may be adjusted based on a current provided by current source 543.

Switching control circuit 55 comprises a peak current control circuit 551, a voltage control circuit 552 and a logic circuit 553. Peak current control circuit 551 is configured to provide a current control signal CI based on current sense signal IS and a peak current reference signal ILimit. Peak current control circuit 551 further comprises en enable terminal configured to receive enable signal EN. When enable signal EN is logic LOW, peak current control circuit 551 is disabled, i.e., shut down. In one embodiment, peak current control circuit 551 comprises a comparator COM1. Voltage control circuit 552 is configured to provide a voltage control signal VI based on feedback signal VFB and reference signal VREF. Voltage control circuit 552 further comprises an enable terminal configured to receive enable signal EN. When enable signal EN is logic LOW, voltage control circuit 522 is disabled, i.e., shut down. In one embodiment, voltage control circuit 522 comprises an error amplifier EA. Logic circuit 553 comprises a set terminal S, a reset terminal R, an enable terminal E and an output terminal Q, wherein set terminal S is configured to receive voltage control signal VI, reset terminal R is configured to receive current control signal CI, enable terminal E is configured to receive enable signal EN, and output terminal Q is configured to provide pulse signal PWM based on current control signal CI and voltage control signal VI. In one embodiment, logic circuit 553 comprises a RS flip-flop.

Under-voltage-lock-out circuit 56 is configured to provide under voltage indicating signal UV1 and an under voltage indicating signal UV2. In one embodiment, under-voltage-lock-out circuit 56 comprises a hysteresis comparator 561 and a hysteresis comparator 562. Hysteresis comparator 561 comprises a non-inverting terminal, an inverting terminal and an output terminal, wherein the non-inverting terminal is coupled to receive auxiliary power supply voltage VCC, the inverting terminal is coupled to receive an auxiliary supply reference signal VCCH and an auxiliary supply reference signal VCCL, and the output terminal is configured to provide under voltage indicating signal UV1 to control terminal 534 of voltage regulating circuit 53. In one embodiment, when auxiliary power supply voltage VCC increases larger than auxiliary supply reference signal VCCH, under voltage indicating signal UV1 becomes logic HIGH (UV1="1") to turn OFF voltage regulating circuit 53. When auxiliary power supply voltage VCC decreases less than auxiliary supply reference signal VCCL, under voltage indicating signal UV1 becomes logic LOW (UV="0") to turn ON voltage regulating circuit 53. Hysteresis comparator 562 comprises a non-inverting terminal, an inverting terminal and an output terminal, wherein the non-inverting terminal is coupled to receive auxiliary power supply voltage VCC, the inverting terminal is coupled to receive auxiliary supply reference signal VCCH and a threshold VTH2, and the output terminal is configured to provide under voltage indicating signal UV2. In one embodiment, when auxiliary power supply voltage VCC increases larger than auxiliary supply reference signal VCCH, under voltage indicating signal UV2 becomes logic HIGH (UV2="1"), and when auxiliary power supply voltage VCC decreases less than threshold VTH2, under voltage indicating signal UV2 becomes logic LOW (UV2="0"). In one embodiment, reference signal VCCH is larger than reference signal VCCL, reference signal VCCL is larger than threshold VTH2, and threshold VTH2 is larger than threshold VTH1. For example, reference signal VCCH may be 4.7V, reference signal VCCL may be 4.5V, threshold VTH2 may be 3.0V, and threshold VTH1 may be 2V. Voltage regulating circuit 53 is turned ON and turned OFF by under voltage indicating signal UV1 to ensure a certain voltage rage of auxiliary power supply voltage VCC with less power loss.

Logic circuit 57 is configured to provide switching control signal CTRL based on pulse signal PWM, protection signal FAULT and under voltage indicating signal UV2. In one embodiment, switch M1 is turned OFF by switching control signal CTRL when under voltage indicating signal UV2 or protection signal FAULT is logic LOW. And switch M1 is controlled by switching control signal CTRL based on pulse signal PWM when under voltage indicating signal UV2 and protection signal FAULT are both logic HIGH. In one embodiment, logic circuit 57 comprises an AND gate. In one embodiment, when auxiliary power supply voltage VCC decreases less than threshold VTH2, switch M1 is turned OFF by under voltage indicating signal UV2 through logic circuit 57. As a result, malfunction of switch M1 caused by low auxiliary power supply voltage VCC is avoided.

Band-gap reference circuit 58 is configured to receive auxiliary power supply voltage VCC, and is configured to provide a band-gap reference signal BANDGAP based on auxiliary power supply voltage VCC. In one embodiment, when enable signal EN is logic LOW, band-gap reference circuit 58 is disabled, i.e., shut down. In one embodiment, band-gap reference circuit 58 comprises a LDO.

In one embodiment, when enable signal EN is logic LOW, control IC 500 is disabled, almost all circuits of control IC 500 are shut down, except restart delay circuit 54. i.e., current sensing circuit 51, fault detection circuit 52, voltage regulating circuit 53, switching control circuit 55, under-voltage-lock-out circuit 56, logic circuit 57 and band-gap reference circuit 58 are shut down. As a result, power loss of control IC 500 is greatly reduced, and a current that capacitor CVCC draws decreases to almost zero amps. It is noted that the logics of "HIGH" or "LOW" for the logic signals may be in alternative levels since different logic levels may lead to a same result.

Figure 6:
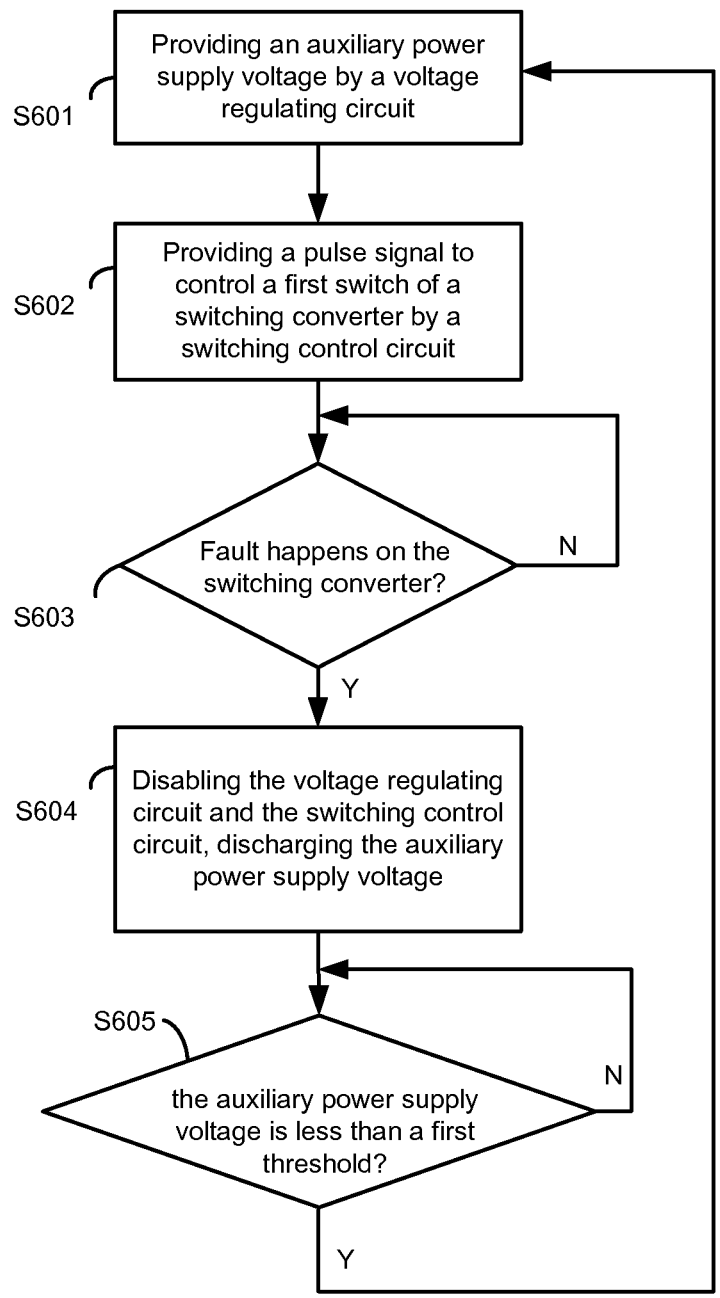
FIG. 6 shows a flow chart illustrating a control method for a switching converter according to an embodiment of the present invention.

FIG. 6 shows a flow chart illustrating a control method for a switching converter according to an embodiment of the present invention.

The switching converter comprises a power stage comprising at least one switch. The control method comprises steps S601-S605.

At step S601, providing an auxiliary power supply voltage by a voltage regulating circuit.

At step S602, providing a pulse signal to turn ON and turn OFF the at least one switch by a switching control circuit. In one embodiment, the switching control circuit is configured to provide the pulse signal based on an output voltage of the switching converter and a reference signal.

At step S603, judging if the switching converter is in a fault condition. In one embodiment, the fault condition comprises over temperature, over load, short circuit, open circuit and so on. When there is a fault happening on the switching converter, then go to step S604.

At step S604, disabling the voltage regulating circuit and the switching control circuit, turning OFF the at least one switch, and discharging a capacitor to reduce the auxiliary power supply voltage.

At step S605, when the auxiliary power supply voltage decreases less than a threshold, the voltage regulating circuit and the switching control circuit are enabled, the switching converter restarts.

Note that in the flow chart described above, the box functions may also be implemented with different order as shown in FIG. 6. For example, two successive box functions may be executed meanwhile, or sometimes the box functions may be executed in reverse order.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A control circuit for controlling a switching converter, the switching converter having a first switch and an output terminal configured to provide an output voltage, the control circuit comprising:
   a voltage regulating circuit, configured to provide an auxiliary power supply voltage across a capacitor;
   a switching control circuit, configured to provide a pulse signal based on a reference signal and a feedback signal representative of the output voltage;
   a first logic circuit, coupled to the switching control circuit, and wherein the first logic circuit is configured to provide a switching control signal to a control terminal of the first switch based on a protection signal and the pulse signal; and
   a restart delay circuit, coupled to the voltage regulating circuit, wherein the restart delay circuit is configured to provide an enable signal based on the protection signal and the auxiliary power supply voltage, and wherein when the protection signal is in a first state, the enable signal is configured to disable the voltage regulating circuit and the switching control circuit until the auxiliary power supply voltage decreases to a first threshold; and wherein
the restart delay circuit further comprising:
an under-voltage detecting circuit, having a first input terminal, a second input terminal and an output terminal, wherein the first input terminal is coupled to the voltage regulating circuit, and the second input terminal is configured to receive the first threshold, and the output terminal is configured to provide a reset signal based on comparing the auxiliary power supply voltage with the first threshold; and
a flip-flop, having a set terminal, a reset terminal and an output terminal, wherein the set terminal is configured to receive the protection signal, the reset terminal is coupled to the output terminal of the under-voltage detecting circuit to receive the reset signal, and the output terminal is configured to provide the enable signal based on the protection signal and the reset signal.

2. The control circuit of claim 1, wherein the switching control circuit further comprising:
a peak current control circuit, configured to provide a current control signal based on a current flowing through the first switch and a peak current reference signal;
a voltage control circuit, configured to provide a voltage control signal based on the feedback signal and the reference signal; and
a second logic circuit, configured to provide the pulse signal based on the current control signal and the voltage control signal.

3. The control circuit of claim 2, wherein the enable signal is configured to disable the peak current control circuit and the voltage control circuit when the protection signal is in the first state.

4. The control circuit of claim 1, further comprising an under-voltage-lock-out circuit, having a first output terminal coupled to the voltage regulating circuit to provide a first under voltage indicating signal based on comparing the auxiliary power supply voltage with a first auxiliary supply reference signal and a second auxiliary supply reference signal, wherein the voltage regulating circuit is controlled by the first under voltage indicating signal.

5. The control circuit of claim 4, wherein the under-voltage-lock-out circuit further comprising a second output terminal, wherein the second output terminal is coupled to the first logic circuit to provide a second under voltage indicating signal based on comparing the auxiliary power supply voltage with the first auxiliary supply reference signal and a second threshold, wherein the first logic circuit is configured to provide the switching control signal based on the second under voltage indicating signal, the protection signal and the pulse signal.

6. The control circuit of claim 4, wherein the enable signal is configured to disable the under-voltage-lock-out circuit when the protection signal is in the first state.

7. The control circuit of claim 1, further comprising a fault detection circuit, configured to provide the protection signal, wherein the protection signal transits to the first state when a fault happens on the switching converter.

8. The control circuit of claim 1, wherein the restart delay circuit further comprising:
a current source coupled between the auxiliary power supply voltage and a ground; and wherein
the current source is configured to discharge the capacitor when the voltage regulating circuit is disabled.

9. A switching converter having an input terminal and an output terminal configured to provide an output voltage, wherein the switching converter comprising:
a first switch, having a control terminal, wherein the first switch is coupled between the input terminal and the output terminal of the switching converter;
a capacitor, having a first terminal and a second terminal; and
a control circuit, having an input terminal, a first output terminal and a second output terminal, wherein the input terminal is coupled to the output terminal of the switching converter, the first output terminal is configured to provide a switching control signal to the control terminal of the first switch, and the second output terminal is coupled to the first terminal of the capacitor to provide an auxiliary power supply voltage; wherein
the switching converter is shut down by the control circuit when a fault happens on the switching converter, and the switching converter restarts after a delay time period, wherein the delay time period is related to the auxiliary power supply voltage; wherein
the control circuit further comprising:
an under-voltage detecting circuit, having a first input terminal, a second input terminal and an output terminal, wherein the first input terminal is coupled to the first terminal of the capacitor, and the second input terminal is configured to receive a first threshold, and the output terminal is configured to provide a reset signal based on the auxiliary power supply voltage and the first threshold; and
a flip-flop, having a set terminal, a reset terminal and an output terminal, wherein the set terminal is configured to receive a protection signal, the reset terminal is coupled to the output terminal of the under-voltage detecting circuit to receive the reset signal, and the output terminal is configured to provide an enable signal based on the protection signal and the reset signal.

10. The switching converter of claim 9, wherein the delay time period is related to a time period that the auxiliary power supply voltage decreases from a predetermined voltage level to a first threshold.

11. The switching converter of claim 9, wherein an enable signal is configured to shut down the switching converter based on the protection signal, and the enable signal is configured to enable the switching converter again based on the auxiliary power supply voltage.

12. The switching converter of claim 9, wherein the control circuit further comprising a current source coupled to the capacitor, and wherein the capacitor is discharged by the current source when the switching converter is shut down.

13. The switching converter of claim 9, wherein the control circuit further comprising:
a voltage regulating circuit, configured to provide the auxiliary power supply voltage across the capacitor;
a switching control circuit, configured to provide a pulse signal based on a reference signal and a feedback signal representative of the output voltage; and
a first logic circuit, coupled to the switching control circuit, and wherein the first logic circuit is configured to provide the switching control signal based on a protection signal and the pulse signal.

14. The switching converter of claim 13, wherein the control circuit further comprising an under-voltage-lock-out circuit, configured to control the voltage regulating circuit based on comparing the auxiliary power supply voltage with a first auxiliary supply reference signal and a second auxiliary supply reference signal.

15. The switching converter of claim 13, wherein the control circuit further comprising:
an under-voltage-lock-out circuit, configured to provide an under voltage indicating signal based on comparing the auxiliary power supply voltage with a first auxiliary supply reference signal and a second threshold; and wherein
the first logic circuit is configured to provide the switching control signal based on the protection signal, the pulse signal and the under voltage indicating signal.

16. A control method for a switching converter, the switching converter having a first switch and an output terminal configured to provide an output voltage, the control method comprising:
providing an auxiliary power supply voltage across a capacitor;
providing a switching control signal to a control terminal of the first switch based on a reference signal and the output voltage; and
providing an enable signal at an output terminal of a flip-flop to enable and disable the switching converter, wherein the flip-flop is set in response to a protection signal, and the flip-flop is reset in response to the auxiliary power supply; and wherein
the switching converter is shut down when a fault happens on the switching converter, and the switching converter restarts after a delay time period, wherein the delay time period is related to a time period that the auxiliary power supply voltage decreases from a predetermined voltage level to a first threshold.

17. The control method of claim 16, wherein the delay time period is related to a capacitance of the capacitor.

18. The control method of claim 16, further comprising providing a predetermined current to discharge the capacitor when the switching converter is shut down, wherein the delay time period is related to the predetermined current.

* * * * *